United States Patent
Furumiya

(10) Patent No.: US 8,064,308 B2
(45) Date of Patent: Nov. 22, 2011

(54) OPTICAL DISK RECORDING DEVICE, METHOD FOR RECORDING DATA ON OPTICAL DISK, AND OPTICAL DISK

(75) Inventor: Shigeru Furumiya, Hyogo (JP)

(73) Assignee: Panasonic Corporation, Osaka (JP)

( * ) Notice: Subject to any disclaimer, the term of this patent is extended or adjusted under 35 U.S.C. 154(b) by 878 days.

(21) Appl. No.: 11/887,222

(22) PCT Filed: Mar. 27, 2006

(86) PCT No.: PCT/JP2006/306131
§ 371 (c)(1),
(2), (4) Date: Sep. 27, 2007

(87) PCT Pub. No.: WO2006/106621
PCT Pub. Date: Oct. 12, 2006

(65) Prior Publication Data
US 2009/0238050 A1    Sep. 24, 2009

(30) Foreign Application Priority Data
Mar. 31, 2005  (JP) .................................. 2005-102155

(51) Int. Cl.
*G11B 7/00*   (2006.01)
(52) U.S. Cl. .................. 369/59.11; 369/47.5; 369/47.28
(58) Field of Classification Search ................. 369/59.11
See application file for complete search history.

(56) References Cited

U.S. PATENT DOCUMENTS

| | | | |
|---|---|---|---|
| 6,504,806 B1 | 1/2003 | Nakajo | |
| 7,139,230 B2 * | 11/2006 | Shirota et al. | 369/59.11 |
| 7,193,948 B2 * | 3/2007 | Furukawa et al. | 369/59.11 |
| 7,376,065 B2 * | 5/2008 | Tabata et al. | 369/59.11 |
| 7,408,860 B2 | 8/2008 | Miura et al. | |
| 2002/0089914 A1 | 7/2002 | Nakajo | |
| 2003/0031108 A1 | 2/2003 | Furumiya et al. | |
| 2003/0058771 A1 | 3/2003 | Furukawa et al. | |
| 2003/0067857 A1 | 4/2003 | Shirota et al. | |
| 2005/0088942 A1 | 4/2005 | Miura et al. | |
| 2005/0163011 A1 | 7/2005 | Miura et al. | |

FOREIGN PATENT DOCUMENTS

| | | |
|---|---|---|
| EP | 0 932 144 | 7/1999 |
| EP | 1 331 631 | 7/2003 |
| EP | 1 365 392 | 11/2003 |
| EP | 1 484 751 | 12/2004 |

(Continued)

OTHER PUBLICATIONS

Russian Office Action issued Mar. 11, 2010 in corresponding Russian Application No. 2007140255.

(Continued)

*Primary Examiner* — Van Chow
(74) *Attorney, Agent, or Firm* — Wenderoth, Lind & Ponack, L.L.P.

(57) ABSTRACT

According to a method of the present invention for recording data on an optical disk, a recording pulse corresponding to a long mark includes a combination of a leading pulse and a subsequent intermediate pulse. Further, a level of the leading pulse indicates a first recording power, and a level of the intermediate pulse indicates a second recording power. When an optical disk includes a plurality of recording layers, a ratio of the second recording power to the first recording power is determined for each recording layer. When the recording speed is variable, the ratio of the second recording power to the first recording power is determined for each recording speed.

9 Claims, 11 Drawing Sheets

FOREIGN PATENT DOCUMENTS

| | | |
|---|---|---|
| JP | 3-296942 | 12/1991 |
| JP | 11-213389 | 8/1999 |
| JP | 2000-285464 | 10/2000 |
| JP | 2001-351239 | 12/2001 |
| JP | 3259643 | 2/2002 |
| JP | 2003-85753 | 3/2003 |
| JP | 2003-178448 | 6/2003 |
| JP | 2003-257025 | 9/2003 |
| JP | 2005-25867 | 1/2005 |
| JP | 2005-158210 | 6/2005 |
| WO | 03/023769 | 3/2003 |
| WO | 2005/017882 | 2/2005 |

OTHER PUBLICATIONS

Supplementary European Search Report issued Mar. 16, 2009 in the Application No. EP 06 73 0079.

International Search Report of Jul. 4, 2006 issued in International Application No. PCT/JP2006/306131.

Communication (along with English translation) filed Oct. 20, 2006 in International Application No. PCT/JP2006/306131.

European Search Report issued Sep. 24, 2009 in Application No. EP 09 16 2896.

* cited by examiner

| Byte number | Content | |
|---|---|---|
| 1 | header | layer number |
| 2 | | condition set number |
| ... | | |
| L | recording speed | |
| ... | | |
| M | recording power conditions | reference power |
| M + 1 | | first power coefficient |
| M + 2 | | second power coefficient |
| M + 3 | | third power coefficient |
| ... | | |
| N | recording pulse conditions | leading pulse width |
| N + 1 | | leading pulse start position |
| N + 2 | | second-half pulse end position |
| N + 3 | | end pulse width |
| ... | | |

Fig. 9

OPTICAL DISK RECORDING DEVICE, METHOD FOR RECORDING DATA ON OPTICAL DISK, AND OPTICAL DISK

BACKGROUND OF THE INVENTION

1. Field of Invention

This invention relates to a device and method for recording data on a write-once or rewritable optical disk, particularly to recording power conditions used therein.

2. Description of the Related Art

The Blu-ray Disc (BD; registered trademark) is known as a new standard for optical disks. With a BD, a standard-speed BD-RE has been gaining practical use in recent years as a rewritable type of optical disk. The one-side capacity of a BD-RE is 25 GB with a single layer, and 50 GB with two layers. A BD-R is also under development as a write-once type of optical disk.

The following method for recording data on an optical disk is known for a conventional BD (see FIG. 11). The upper part in FIG. 11 is an example 900 of digital data (hereinafter referred to as recording data) to be recorded on an optical disk. The recording data 900 includes a high-level (Hi) signal with a pulse width of 2T (2 times the recording clock period T), a low-level (Lo) signal with a pulse width of 5T, and a Hi signal with a pulse width of 8T, in that order. The middle part in FIG. 11 is an example 901 of a recording pulse produced according to the recording data 900. The level of the recording pulse 901 corresponds to the power of the laser beam to be directed at the optical disk. The lower part in FIG. 11 shows a recording state 902 of a recording track 903 of the optical disk. This recording track 903 is irradiated with the laser beam at power levels corresponding to the recording pulse 901. The mark 904 is formed at a portion of the recording track 903 irradiated with the laser beam at a power level of at least a predetermined lower limit, and the space 905 is formed at a portion irradiated with the laser beam at a power level below the lower limit. In the example in FIG. 11, the boundary between the mark 904 and the space 905 corresponds to a change point in the levels of the recording data 900.

The recording pulse 901 generally includes a top pulse 907, a multi-pulse 909, a cooling pulse 910, and a space pulse (see FIG. 11). The level of the top pulse 907 is a peak level 906. The levels of the pulses of the multi-pulse 909 are switched binarily to the peak level 906 and a bottom level 908. The level of the cooling pulse 910 is equal to the bottom level 908. The space pulse is equivalent to a bias level 911 maintained from the rear end of the cooling pulse 910 to the front end of the next top pulse 907. The peak power of the laser beam corresponding to the peak level 906 is higher than the lower limit of the power required to form a mark on the recording track 903, and the bottom power of the laser beam corresponding to the bottom level 908 is lower than the lower limit. Furthermore, the bias power of the laser beam corresponding to the bias level 911 is lower than the above-mentioned lower limit and higher than the bottom power. The mark 904 is formed at the portion of the recording track 903 irradiated with the laser beam at a power corresponding to the top pulse 907 and the, multi-pulse 909, and the space 905 is formed at the portion irradiated with the laser beam at a power corresponding to the bias power. The length of the mark 904 here is determined by whether or not there is a multi-pulse 909 and by the number of pulses included therein. Such conditions regarding the waveform of the recording pulse 901 are generally called a write strategy. Write strategies are broadly classified into recording power conditions and recording pulse conditions. Recording power conditions specify the peak power, bottom power, and bias power. Recording pulse conditions specify the temporal conditions for the top pulse 907, the multi-pulse 909, and the cooling pulse 910 (such as their pulse widths and edge positions). Marks can be formed in right shapes particularly by suitably setting the write strategy.

BRIEF SUMMARY OF THE INVENTION

To further raise the speed of recording data on an optical disk, it is preferable for the recording clock frequency to be about 2 to 16 times the reference value. However, with a write strategy utilized in conventional optical disk recording devices, as shown in FIG. 11, for example, the widths of the pulses included in the reference-speed multi-pulse 909 is equal to one-half the recording clock period T. Since the recording clock period T is shortened in inverse proportion to an increase in the recording clock frequency, the rise of the laser beam has to be even faster to produce an accurate multi-pulse 909 during high-speed data recording. However, further raising the rise rate of the laser beam is not easily accomplished.

The inventors in this application studied a "technique for recording data on an optical disk that reduces distortion in long marks, without using a multi-pulse of narrow width" (see, for example, Patent Document 1). This technique involves the use of the following write strategy. In the formation of the shortest mark, the recording pulse is made up of a single rectangular pulse. In the formation of the long mark, the recording pulse is made up of a combination of two pulses (i) a first-half pulse and (ii) a subsequent second-half pulse. In particular, the level of the second-half pulse is lower than the level of the first-half pulse. It has become apparent that this technique can be applied not only to DVD, but also to BD. Nevertheless, when data is recorded by this technique on a multilayer disk including a plurality of recording layers, it has been difficult to suppress the distortion of marks in all of the recording layers because the heat radiation conditions vary from layer to layer. Furthermore, when the linear velocity of the optical disk is changed during data recording with the above technique, it has been difficult to suppress the distortion of marks at all linear velocities because the heat characteristics of the recording layers vary with the linear velocity. For instance, when the power of the laser beam is optimized during recording at a high linear velocity, it is impossible to avoid the expansion of a long mark in particular because the laser beam power becomes too high during recording at a low linear velocity. Conversely, when the power of the laser beam is optimized during recording at a low linear velocity, the contraction of the shortest mark in particular cannot be avoided because the laser beam power becomes insufficient during recording at a high linear velocity. This distortion of marks is a problem in that it impedes further improvement in recording quality.

It is an object of the present invention to provide an optical disk recording device and a data recording method with which recording quality can be further improved by suppressing the distortion of marks regardless of differences in recording layer or linear velocity.

The optical disk recording device pertaining to one aspect of the present invention, and the method for recording data on an optical disk in which the device is used, preferably involve producing a recording pulse that includes a combination of a leading pulse corresponding to a first recording power and a subsequent intermediate pulse corresponding to a second recording power, and recording data on the optical disk on the basis of the recording pulse. In particular, with this optical disk recording device and the data recording method thereof, when data is recorded on an optical disk with a multilayer structure (hereinafter referred to as a multilayer disk), the ratio of the second recording power to the first recording power is determined for each recording layer. Even more preferably here, this determination is performed by a semiconductor integrated circuit mounted in this optical disk recording device. The result of this determination is that distortion of marks is sufficiently suppressed in all of the recording layers, even though the heat radiation conditions vary from layer to layer. For instance, with a multilayer disk, the recording layer farthest from the head is generally close to the thickest reflective layer, so heat escapes more readily than from other recording layers. Consequently, the ratio of the second recording power to the first recording power is higher in the recording layer farthest from the head than in the other recording layers. This means that when long marks in particular are formed on the recording layer farthest from the head, a high level is maintained in portions of the recording pulse corresponding to marks. As a result, the irradiating laser beam is maintained at a high power in those portions of the recording track where marks are to be formed, and the reduction in the amount of heat storage accompanying an increase in the amount of heat radiation is cancelled out. Thus, long marks are reliably formed in the same size and shape as the long marks formed on the other recording layers.

The optical disk pertaining to one aspect of the present invention preferably has a plurality of recording layers, and a region where data is recorded expressing the ratio of the second recording power to the first recording power set for each recording layer. Here, the above-mentioned optical disk recording device pertaining to the present invention may record that data on the optical disk. More preferably, when data is recorded on this optical disk pertaining to the present invention by the above-mentioned optical disk recording device pertaining to the present invention, the ratio of the second recording power to the first recording power is read out in advance from the optical disk. This allows the power of the laser beam to be adjusted more quickly.

The optical disk recording device pertaining to another aspect of the present invention, and the method for recording data on an optical disk in which the device is used, preferably involve producing a recording pulse that includes a combination of a leading pulse corresponding to a first recording power and a subsequent intermediate pulse corresponding to a second recording power, and recording data on an optical disk on the basis of the recording pulse. In particular, with this optical disk recording device and the data recording method thereof, when data is recorded on the same optical disk at different linear velocities, the ratio of the second recording power to the first recording power is determined for each linear velocity. Even more preferably here, this determination is performed by a semiconductor integrated circuit mounted in the optical disk recording device. The result of this determination is that distortion of marks is sufficiently suppressed at all linear velocities even though the heating conditions (particularly the relationship between the thermal transfer rate of the recording layer and the movement rate of the region heated by the laser beam) of the optical disk are changed for each linear velocity. More preferably, the higher the linear velocity of the optical disk, the higher the ratio of the second recording power to the first recording power. This means that when long marks in particular are formed at a high linear velocity, a high level is maintained in portions of the recording pulse corresponding to marks. As a result, the irradiating laser beam is maintained at a high power in those portions of the recording track where marks are to be formed, and the relative reduction in the thermal transfer rate accompanying an increase in linear velocity is cancelled out. Thus, long marks are reliably formed in the same size and shape as the long marks formed when the linear velocity is low.

The optical disk pertaining to another aspect of the present invention preferably has a region where data is recorded expressing the ratio of the second recording power to the first recording power set for each linear velocity. Here, the above-mentioned optical disk recording device pertaining to the present invention may record this data on the optical disk. More preferably, when the above-mentioned optical disk recording device pertaining to the present invention records data on this optical disk pertaining to the present invention, the ratio of the second recording power to the first recording power is read out in advance from the optical disk. This allows the power of the laser beam to be adjusted more quickly.

The optical disk recording device pertaining to another aspect of the present invention, and the method for recording data on an optical disk in which the device is used, preferably involve producing a recording pulse that includes a combination of a leading pulse corresponding to a first recording power and a subsequent intermediate pulse corresponding to a second recording power, and a space pulse corresponding to a third recording power, and recording data on the optical disk on the basis of the recording pulse. In particular, with this optical disk recording device and the data recording method thereof, the third recording power is kept within a range of less than the lower limit of the power required to form a mark and at least half the value of the lower limit. Here, it is preferable if the third recording power is kept within this range by a semiconductor integrated circuit mounted in the optical disk recording device. Preferably, when the linear velocity is lower than the optimal value specific to the optical disk, the third recording power is kept within the range. This enhances the reduction of the first recording power over the reduction accompanying a decrease in linear velocity, without distorting the marks. As a result, power consumption can be reduced while still maintaining high recording quality.

The optical disk pertaining to another aspect of the present invention preferably has a region where data is recorded expressing the third recording power, which is set to a range of less than the lower limit of the power required to form a mark and at least half the value of the lower limit. Here, the above-mentioned optical disk recording device pertaining to the present invention may record this data on the optical disk. More preferably, when the above-mentioned optical disk recording device pertaining to the present invention records data on this optical disk pertaining to the present invention, the third recording power is read out in advance from the optical disk. This allows the power of the laser beam to be adjusted more quickly.

The optical disk recording device pertaining to yet another aspect of the present invention, and the method for recording data on an optical disk in which the device is used, preferably involve producing a recording pulse that includes a combination of a leading pulse corresponding to a first recording power and a subsequent intermediate pulse corresponding to a second recording power, and a space pulse corresponding to a third recording power, and recording data on an optical disk on the basis of the recording pulse. In particular, with this optical disk recording device and the data recording method thereof, when data is recorded on a multilayer disk, the ratio of the third recording power to the first recording power is determined for each recording layer. Even more preferably here, this determination is performed by a semiconductor integrated circuit mounted in this optical disk recording device. The result of this determination is that distortion of marks is sufficiently suppressed in all of the recording layers, even though the heat radiation conditions vary from layer to layer. Preferably, the ratio of the third recording power to the first recording power is higher for the recording layer farthest from the head than for the other recording layers. Consequently, the power of the laser beam irradiating the portions of the recording track where spaces are to be formed is higher in the recording layer farthest from the head than in the other recording layers, so the reduction in residual heat accompanying an increase in the amount of heat radiation is cancelled out. As a result, the residual heat imparted to the spaces moderately suppresses expansion of the marks, and the shape and size of the shortest mark in particular are reliably equal to those of the shape and size of the shortest mark formed on the other recording layers.

The optical disk pertaining to yet another aspect of the present invention preferably has a plurality of recording layers and a region where data is recorded expressing the ratio of the third recording power to the first recording power set for each recording layer. Here, the above-mentioned optical disk recording device pertaining to the present invention may record this data on the optical disk. More preferably, when the above-mentioned optical disk recording device pertaining to the present invention records data on this optical disk pertaining to the present invention, the ratio of the third recording power to the first recording power is read out in advance from the optical disk. This allows the power of the laser beam to be adjusted more quickly.

The optical disk recording device pertaining to yet another aspect of the present invention, and the method for recording data on an optical disk in which the device is used, preferably involve producing a recording pulse that includes a combination of a leading pulse corresponding to a first recording power and a subsequent intermediate pulse corresponding to a second recording power, and a space pulse corresponding to a third recording power, and recording data on an optical disk on the basis of the recording pulse. In particular, with this optical disk recording device and the data recording method thereof, when data is recorded on the same optical disk at different linear velocities, the ratio of the third recording power to the first recording power is determined for each linear velocity. Even more preferably here, this determination is performed by a semiconductor integrated circuit mounted in this optical disk recording device. The result of this determination is that distortion of marks is sufficiently suppressed at all linear velocities even though the heating conditions (particularly the relationship between the thermal transfer rate of the recording layer and the movement rate of the region heated by the laser beam) of the optical disk are changed for linear velocity. Preferably, the higher the linear velocity of the optical disk, the lower the ratio of the third recording power to the first recording power. Specifically, at a high linear velocity, the power of the laser beam irradiating portions of the recording track where spaces are to be formed is kept low. As a result, there is greater contrast between the residual heat imparted to the spaces and the heat imparted to the marks, so the shape and size of the shortest mark in particular are reliably equal to the shape and size of the shortest mark formed at a low linear velocity.

The optical disk pertaining to yet another aspect of the present invention preferably has a region where data is recorded expressing the ratio of the third recording power to the first recording power set for each linear velocity. Here, the above-mentioned optical disk recording device pertaining to the present invention may record this data on the optical disk. More preferably, when the above-mentioned optical disk recording device pertaining to the present invention records data on this optical disk pertaining to the present invention, the ratio of the third recording power to the first recording power is read out in advance from this optical disk. This allows the power of the laser beam to be adjusted more quickly.

EFFECT OF INVENTION

As discussed above, with the optical disk recording device and the data recording method thereof pertaining to the present invention, the distortion of marks can be further suppressed, and recording quality can be further enhanced, even when the optical disk includes a plurality of recording layers or when the linear velocity of the optical disk during recording is different from the optimal value specific to that optical disk. Therefore, the present invention is advantageous for further increasing the capacity of next-generation optical disks, and further increasing the speed of data recording.

BRIEF DESCRIPTION OF THE DRAWINGS

FIG. 9 is a table of the formats of recording condition sets pertaining to the embodiment of the present invention;

DETAILED DESCRIPTION OF THE INVENTION

Preferred embodiments of the present invention will now be described through reference to the drawings.

Figure 3:
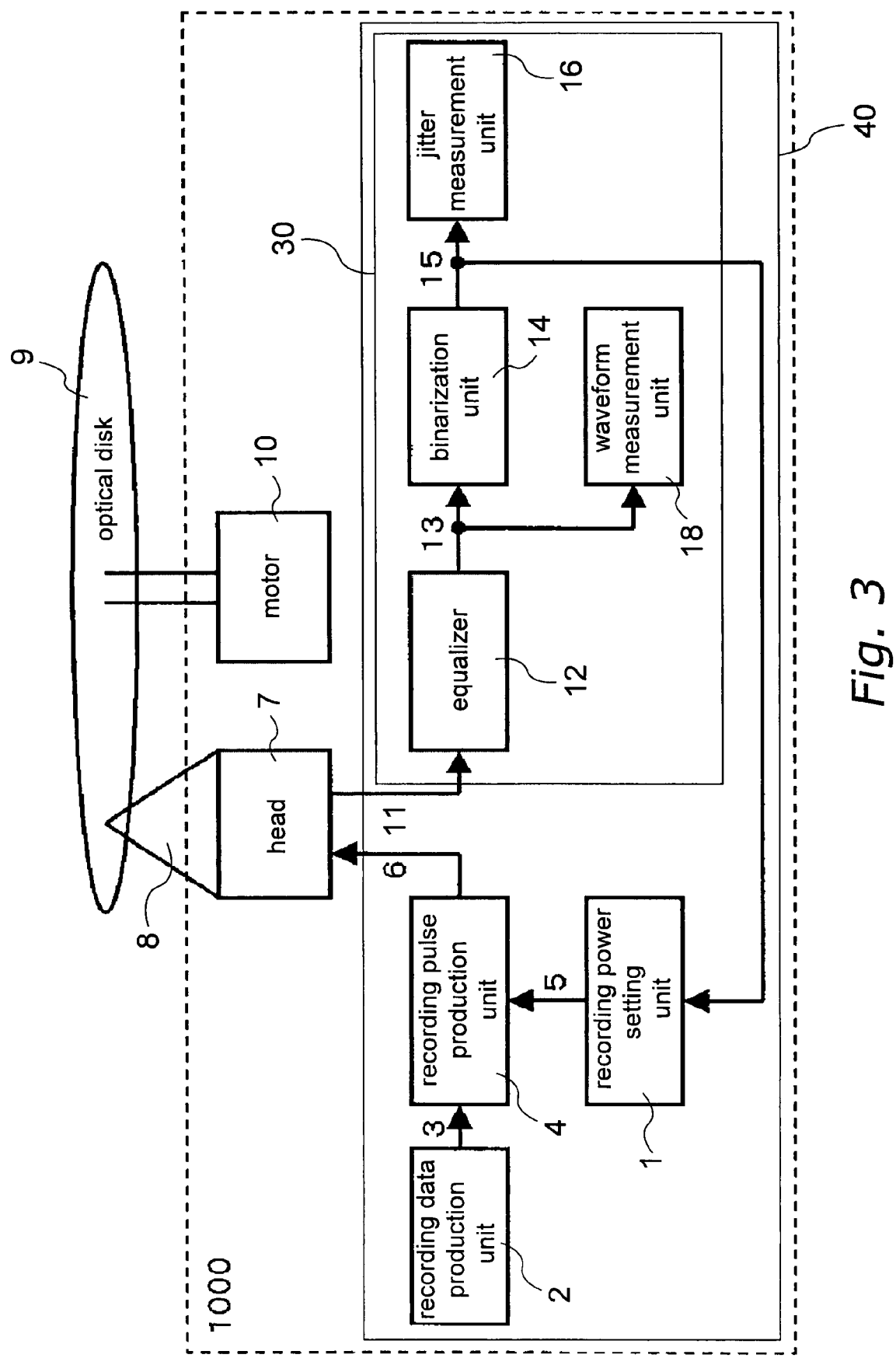
FIG. 3 is a block diagram of the structure of an optical disk recording device pertaining to the embodiment of the present invention.

FIG. 3 shows the structure of an optical disk recording and reproduction device pertaining to an embodiment of the present invention. This optical disk recording and reproduction device 1000 is used in all of Embodiments 1 to 4 described below. The optical disk recording and reproduction device 1000 has a recording power setting unit 1, a recording data production unit 2, a recording pulse production unit 4, a spindle motor 10, a head 7, and a reader 30. Preferably, the recording power setting unit 1, the recording data production unit 2, the recording pulse production unit 4, and the reader 30 are unified in a single semiconductor integrated circuit 40.

The recording power setting unit 1 produces recording power conditions 5. The recording power conditions 5 here vary for each linear velocity or for each recording layer of an optical disk 9, as in Embodiments 1 to 4 described below. In particular, the recording power setting unit 1 identifies the recording layer of the optical disk 9 where data is to be recorded, or identifies the linear velocity of the optical disk 9, and produces suitable recording power conditions according to the identified results. The recording data production unit 2 produces recording data 3 to be recorded on the optical disk 9 on the basis of the data to be recorded. The recording data 3 is a digital signal, and is made up of two parts: a high level (Hi) signal and a low level (Lo) signal. The format of the recording data 3 is preferably such that the minimum value of the run length limit is set to 2 times (=2T) the recording clock frequency T, and the maximum value is set to 8 times (=8T). The run length limit may also be set to other values. The recording pulse production unit 4 produces recording pulses 6 corresponding to the recording data 3, according to a predetermined write strategy (including the recording power conditions 5). Here, the duration of a Hi signal of the recording data 3 corresponds to a mark, and the duration of a Lo signal corresponds to a space. The recording pulses 6 in particular indicate the power of a laser beam 8 that irradiates the optical disk 9.

The spindle motor 10 rotates the optical disk 9 at a predetermined linear velocity. The head 7 includes a laser with variable power. The laser directs the laser beam 8 at the rotating optical disk 9. The laser beam 8 is focused on a recording track of the optical disk 9. The head 7 produces the power of the laser beam 8 according to the recording pulses 6. As a result, a mark is formed on the recording layer of the optical disk 9 during the duration of a Hi signal of the recording data 3, and a space is formed during the duration of a Lo signal. The head 7 also directs the laser beam 8 at the recording layer of the optical disk 9 at a specific power that is less than the above-mentioned lower limit (hereinafter referred to as a reproduction power), and detects changes in the intensity of the reflected light.

With the reader 30, the head 7 directs the laser beam 8 at the recording layer of the optical disk 9 at the reproduction power, and detects changes in the intensity of the reflected light. The reader 30 also decodes data recorded on the optical disk 9 from the detected changes in the intensity of the reflected light. The reader 30 preferably includes an equalizer 12, a binarization unit 14, a jitter measurement unit 16, and a waveform measurement unit 18. The equalizer 12 receives an analog reproduction signal 11 indicating the changes in the intensity of reflected light detected by the head 7, corrects attenuation of the high-band frequency component of this signal, and outputs the result as an equalized reproduction signal 13. The binarization unit 14 binarizes the equalized reproduction signal 13 based on a predetermined slice level, and outputs the result as a digital reproduction signal 15. The jitter measurement unit 16 detects the rising or falling edge of the digital reproduction signal 15, and measures the time lag or the amount of variance of this edge. The waveform measurement unit 18 measures the waveform or amplitude of the equalized reproduction signal 13.

Figure 2:
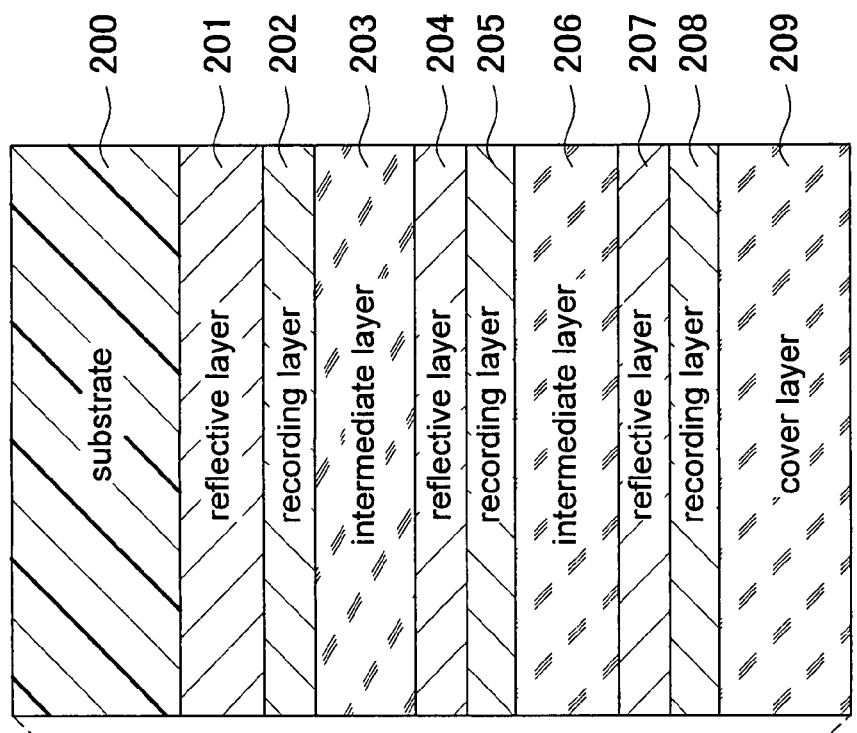
FIG. 2 is a diagram of the optical disk pertaining to the embodiment of the present invention, and the lamination structure thereof.
Figure 2:
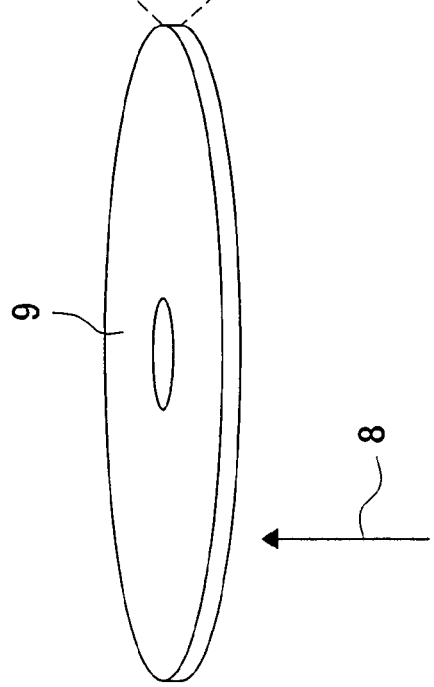

The optical disk 9 is preferably a rewritable or a write-once type of optical disk, and more preferably is a BD. A spiral recording track is formed on the substrate or an intermediate layer of the optical disk 9, and a recording layer such as a phase-change film, dye film is formed in this recording track. The region of the recording layer irradiated with the laser beam 8 undergoes physical or chemical changes according to the power of the laser beam 8. Marks or spaces are formed in the recording track as a result. FIG. 2 shows an example of the lamination structure of the optical disk 9. The optical disk 9 is preferably an optical disk with a three-layer structure (three-layer disk), and includes three recording layers 202, 205, and 208. The three recording layers 202, 205, and 208 each have a thickness of about 5 to 20 nm. If the optical disk 9 is a phase-change optical disk, the three recording layers 202, 205, and 208 preferably include a tellurium-oxygen-palladium alloy or a germanium-bismuth-tellurium alloy. The three recording layers 202, 205, and 208 may also include an organic dye material. These dyes undergo irreversible change when exposed to the heat of the laser beam 8. Each of the three recording layers 202, 205, and 208 may also have such a multilayer structure that its two sides are sandwiched between interface layers, dielectric layers, or the like.

In addition to the three recording layers 202, 205, and 208, the optical disk 9 includes a substrate 200, three reflective layers 201, 204, and 207, two intermediate layers 203 and 206, and a cover layer 209 (see FIG. 2). In particular, the reflective layer 201, the recording layer 202, the intermediate layer 203, the reflective layer 204, the recording layer 205, the intermediate layer 206, the reflective layer 207, the recording layer 208, and the cover layer 209 are laminated in that order on the substrate 200. Here, the laser beam 8 irradiates the optical disk 9 from the outside of the cover layer 209 (the bottom side of the optical disk 9 in FIG. 2). The substrate 200 maintains the mechanical strength of the optical disk 9. The substrate 200 preferably has a thickness of about 1.1 mm, and includes a polycarbonate resin. The reflective layer 201 formed on the substrate 200 has higher optical reflectance than the other reflective layers 204 and 207, and reflects all of the laser beam 8 transmitted through the recording layer 202. The reflective layer 201 is preferably a metal film with a thickness of about 100 nm. On the other hand, the other reflective layers 204 and 207 are both semitransparent, reflect only part of the laser beam 8 transmitted through the recording layers 205 and 208 respectively formed on those reflective layers, and transmit the rest of the beam. The other reflective layers 204 and 207 are preferably metal films with a thickness of about 10 nm. Since the reflective layer 201 closest to the substrate 200 is thicker than the other reflective layers 204 and 207, its thermal capacity is larger than that of the other reflective layers 204 and 207. The intermediate layers 203 and 206 preferably both have a thickness of about 0.02 mm, and include resin with a high degree of transparency. The cover layer 209 protects the above-mentioned lamination structure consisting of the reflective layers, recording layers, and intermediate layers. The cover layer 209 preferably has a thickness of about 0.02 to 0.1 mm, and includes hard resin with a high degree of transparency. The thickness of the entire lamination structure above is preferably about 1.2 mm.

Wobble is preferably formed at the edge of the recording track. In addition, pits may be formed in part of the recording track or nearby. The physical address of the recording track or other such data that is used permanently (no overwrite or write necessary) is preferably recorded in the wobble or pits.

In particular, a read-only region is provided to the wobble or pits at an inner periphery of the disk. When the optical disk 9 has been loaded into the optical disk recording and reproduction device 1000, the data recorded in the read-only region is read first. If the optical disk 9 is a BD, the read-only region is called a PIC region (a region in which PIC (permanent information control) data is recorded), and in particular includes a DI region (a region in which DI (disk information) is recorded). Furthermore, the DI region is also included in an auxiliary data region provided to the wobbles at various places along the recording track.

Data expressing the recording conditions specific to that optical disk 9 (hereinafter referred to as a recording condition set) is preferably recorded in the read-only region of the optical disk 9 (see FIG. 9). The recording condition set is preferably arranged in about 100 bytes for example, for each recording layer and for each recording speed (the linear velocity of the optical disk 9 during data recording). The header of a recording condition set includes, for example, the number assigned to the recording layer in question (layer number: 1 byte) and the number assigned to that recording condition set (condition set number: 1 byte). A recording condition set also includes recording pulse conditions, recording power conditions 5, and recording speed (1 byte) that can be used to record data to the recording layer in question. With the optical disk recording and reproduction device 1000, the recording condition set is preferably read from the read-only region after the optical disk 9 has been loaded. The optical disk recording and reproduction device 1000 determines the recording power conditions or recording pulse conditions for each recording layer of the optical disk 9 or for each linear velocity of the optical disk 9, on the basis of the recording condition set that has been read. The recording condition set may also be recorded as rewritable data in a write-once or rewritable region other than the read-only region.

The method for recording data on an optical disk pertaining to the present invention preferably utilizes the above-mentioned optical disk recording and reproduction device 1000 and optical disk 9. In this case, the method for recording data on an optical disk pertaining to the present invention preferably has the following four Embodiments 1 to 4.

Embodiment 1

The method for recording data on an optical disk pertaining to Embodiment 1 of the present invention is utilized, for example, when the above-mentioned optical disk recording and reproduction device 1000 records data on either of the recording layer 202 closest to the substrate 200 (that is, deepest) and the middle recording layer 205 (see FIG. 2).

Figure 1:
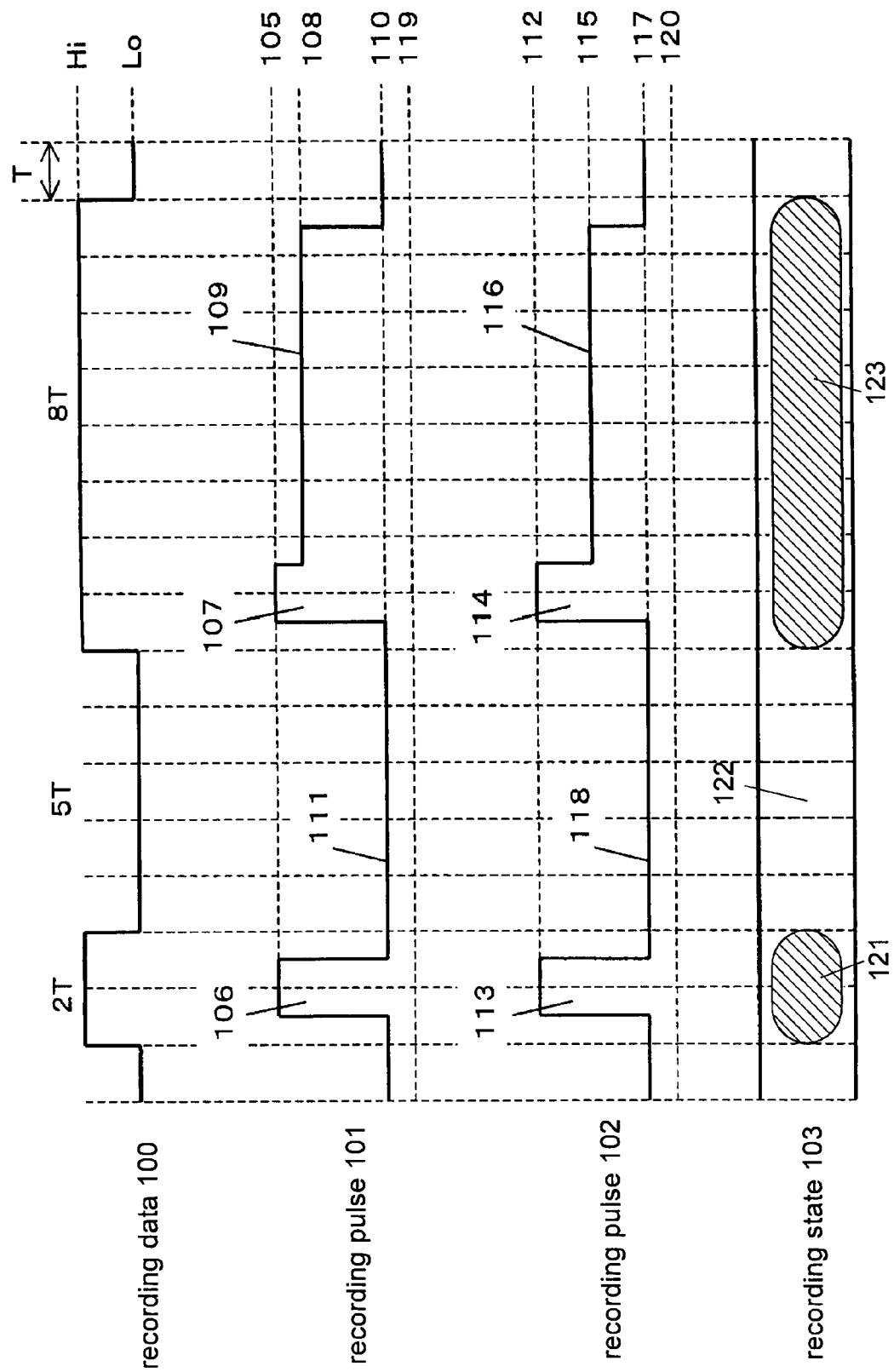
FIG. 1 consists of waveform diagrams of the recording pulses and the recording data used in the method for recording data on an optical disk pertaining to Embodiment 1 of the present invention, and an enlarged plan view of the shapes of the marks formed on the recording track.

In FIG. 1, recording data 100 include a high-level (Hi) signal with a pulse width of 2T (2 times the recording clock period T), a low-level (Lo) signal with a pulse width of 5T, and a Hi signal with a pulse width of 8T, in that order. The Hi signal with a pulse width of 2T corresponds to the shortest mark 121 with a length of 2T, the Lo signal with a pulse width of 5T corresponds to a space 122 with a length of 5T, and the Hi signal with a pulse width of 8T corresponds to a long mark 123 with a length of 8T. When the recording data 100 is to be written on the deepest recording layer 202, the recording pulse production unit 4 produces a recording pulse 101 corresponding to the recording data 100 according to recording power conditions and the recording pulse conditions used for the deepest recording layer 202. Meanwhile, when the recording data 100 is to be written on the middle recording layer 205, the recording pulse production unit 4 produces a recording pulse 102 corresponding to the recording data 100 according to the recording power conditions and the recording pulse conditions used for the middle recording layer 205. With these two recording pulses 101 and 102, leading pulses 106 and 113 each correspond to the shortest mark 121, space pulses 111 and 118 each correspond to a space with a length of 5T, and combinations (107 and 109; 114 and 116) of the leading pulses and the subsequent intermediate pulses each correspond to the long mark 123 with a length of 8T. With respect to reference levels 119 and 120, levels 105 and 112 of the leading pulses 106, 107, 113, and 114 each indicate a first recording power, levels 108 and 115 of the intermediate pulses 109 and 116 each indicate a second recording power, and levels 110 and 117 of the space pulses 111 and 118 each indicate a third recording power. Here, the first recording power is sufficiently higher than the lower limit of the power required to form marks on the recording layers 202 and 205 of the optical disk 9. The second recording power is lower than the first recording power, and equal to or greater than the above-mentioned lower limit. The third recording power is less than the above-mentioned lower limit.

The ratio of the level of the intermediate pulse to that of the leading pulse, that is, the ratio of the second recording power to the first recording power, in particular differs between the two recording pulses 101 and 102. In FIG. 1, the ratio of the level 108 of the intermediate pulse 109 to the level 105 of the leading pulse 107 in the recording pulse 101 is higher than the ratio of the level 115 of the intermediate pulse 116 to the level 112 of the leading pulse 114 in the recording pulse 102. Therefore, the ratio of the second recording power to the first recording power in the recording pulse 101 is higher than this ratio in the recording pulse 102.

The ratio of the second recording power to the first recording power is varied as above between the deepest recording layer 202 and the middle recording layer 205 for the following reason. The reflective layer 201 adjacent to the deepest recording layer 202 is, as mentioned above, considerably thicker than the reflective layer 204 adjacent to the middle recording layer 205 (see FIG. 2). As a result, heat escapes from the deepest recording layer 202 more readily than from the middle recording layer 205. However, as mentioned above, the ratio of the second recording power to the first recording power is higher in the deepest recording layer 202 than in the middle recording layer 205. In FIG. 1, the power of the laser beam is kept high in the portions 107 and 109 of the recording pulse 101 corresponding to the long mark 123. As a result, in the region of the recording track where the long mark 123 is to be formed, the reduction in the amount of heat storage accompanying an increase in the amount of heat radiation in the deepest recording layer 202 is cancelled out. In this way, the same high-quality recording state 103 (and particularly the right size and shape of the long mark 123) is reliably maintained on both the deepest recording layer 202 and the middle recording layer 205.

This effect was actually confirmed by the following procedure.

Figure 4:
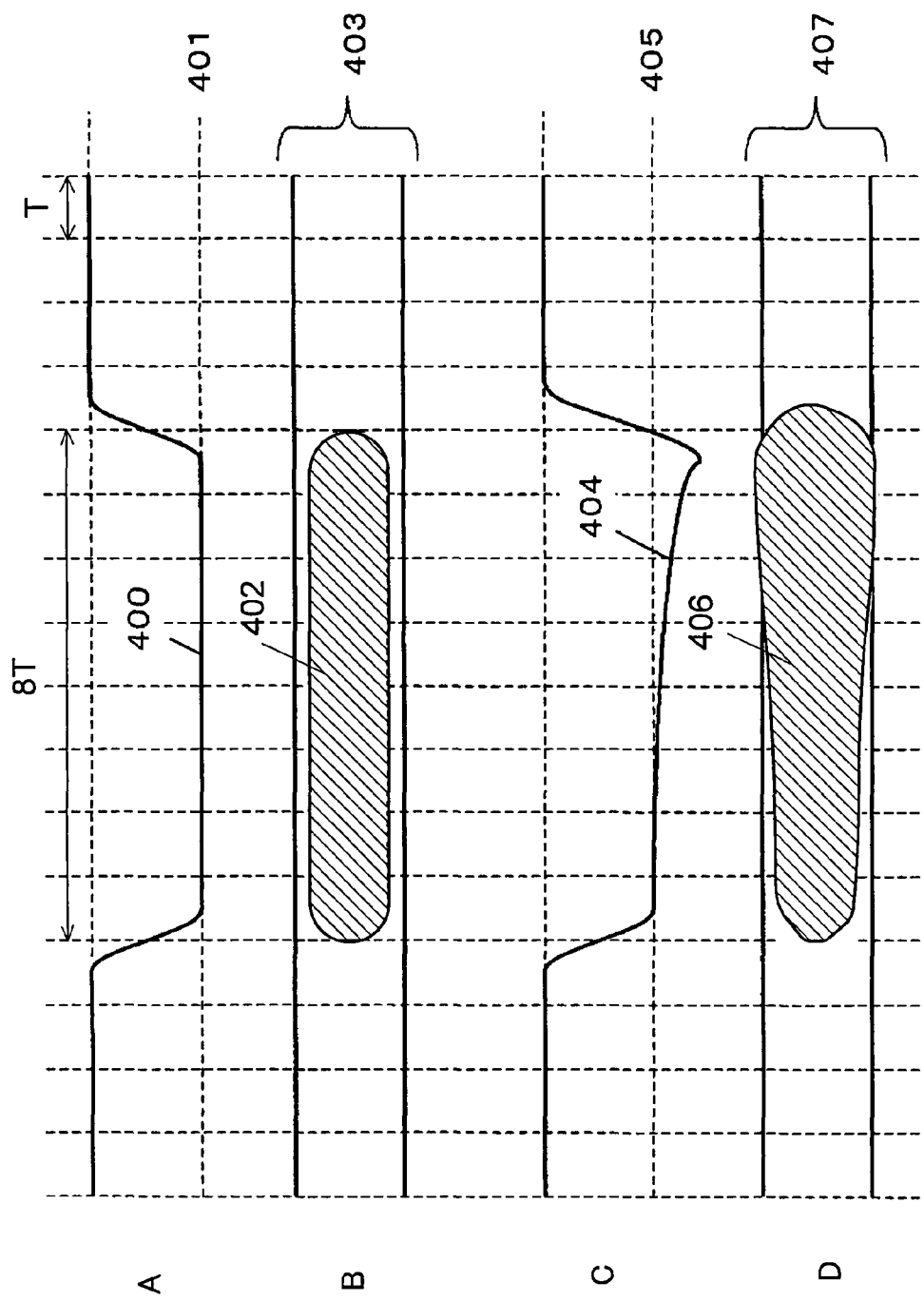
FIG. 4 is a diagram of the relationships between the waveforms of equalized reproduction signals and the shape of the marks on the recording track in Embodiment 1 of the present invention.

First, both the deepest recording layer 202 and the middle recording layer 205 were irradiated with the laser beam at a power according to a combination of the leading pulse 107 and the intermediate pulse 109 included in the recording pulse 101 (see FIG. 1). Next, with the laser beam at reproduction power, the reader 30 (see FIG. 3) scanned the portions of the recording layers 202 and 205 irradiated with the laser beam, and reproduced data from the light thus reflected. FIG. 4 shows the relationship between (i) the waveforms of equalized reproduction signals measured by the waveform measurement unit 18 (see FIG. 3) of the reader 30, and (ii) the shapes of the marks. As shown in FIG. 4A, with the equalized reproduction signal obtained from the deepest recording layer 202, the width of a pulse 400 was the correct value of 8T, and the entire pulse 400 was flat and maintained at the correct level 401. This tells us that in the deepest recording layer 202, a long mark 402 formed on a recording track 403 is maintained uniformly at the proper width in the lengthwise direction without distortion and has its edges at the correct positions (see FIG. 4B). Meanwhile, as shown in FIG. 4C, with the equalized reproduction signal obtained from the middle recording layer 205, the rear half of a pulse 404 with a pulse width of 8T was sloped, and the level thereof deviated greatly from the correct value 405. This tells us that with the middle recording layer 205, the rear half of a long mark 406 formed on a recording track 407 is enlarged, and more particularly, that the width of the mark is too large, and the edge position deviates to the outside.

Then, the middle recording layer 205 was irradiated with the laser beam at a power according to a combination of the leading pulse 114 and the intermediate pulse 116 included in the recording pulse 102 (see FIG. 1). The reader 30 reproduced data from the portions of the middle recording layer 205 irradiated with this laser beam. Here, the equalized reproduction signal measured by the waveform measurement unit 18 of the reader 30 was maintained at the proper level and in a good pulse shape, just as with the waveform shown in FIG. 4A. This tells us that with the middle recording layer 205, the proper long mark is formed on the recording track.

As described above, with the data recording method pertaining to Embodiment 1 of the present invention, the ratio of the second recording power to the first recording power is determined for every recording layer of the optical disk 9. Thus, as mentioned above, the difference in the heat radiation conditions between recording layers is cancelled out. As a result, distortion, and particularly that of long marks, is suppressed in any of the recording layers. Thus, even better recording quality can be attained.

Preferably, the ratio of the second recording power to the first recording power set for every recording layer is recorded on the read-only region of the optical disk 9. This ratio is preferably expressed in the recording power conditions included in the recording condition set (see FIG. 9). In the recording condition set, the recording power conditions preferably are expressed by a reference power, a first power coefficient, a second power coefficient, and a third power coefficient. The reference power expresses a reference value for the power of the laser beam. The first power coefficient expresses the ratio of the first recording power to the reference power. The second power coefficient expresses the ratio of the second recording power to the first recording power. The third power coefficient expresses the ratio of the third recording power to the first recording power. The recording power conditions may also include the first to third recording power values themselves. Furthermore, the first to third power coefficients may express the respective ratios of the first to third recording powers to the reference power. With the optical disk 9 pertaining to Embodiment 1 of the present invention, the ratio of the second recording power to the first recording power expressed in the recording condition set with respect to the deepest recording layer 202 is higher than the ratio expressed in the recording condition set with respect to the other recording layers 205 and 208.

With the optical disk recording and reproduction device 1000 pertaining to Embodiment 1 of the present invention, preferably, when the optical disk 9 has been loaded, the recording power setting unit 1 uses the reader 30 to read out the recording condition set from the read-only region of the optical disk 9. Further, the recording power setting unit 1 determines the ratio of the second recording power to the first recording power for every recording layer on the basis of the information extracted from the recording condition set that is read out. In addition, the recording power setting unit 1 may perform laser power correction on the basis of the information extracted from the recording condition set, and in particular the ratio of the second recording power to the first recording power may be optimized for every recording layer. In this case, the ratio of the second recording power to the first recording power that has been optimized by the recording power setting unit 1 for every recording layer is preferably recorded on the optical disk 9. The recording power setting unit 1 refers to this optimized ratio in the next recording. This allows the laser beam power to be adjusted more quickly.

Embodiment 2

The method for recording data on an optical disk pertaining to Embodiment 2 of the present invention is utilized, for example, when the above-mentioned optical disk recording and reproduction device 1000 sets the recording speed (the linear velocity of the optical disk 9 during data recording) to its usual value (the optimal value specific to the optical disk 9 (such as a standard speed)), or to a higher value (such as a double speed), and records data on the middle recording layer 205 (see FIG. 2). Here, the optical disk recording and reproduction device 1000 reproduces the data recorded on the optical disk 9 at the usual speed (such as a standard speed).

Figure 5:
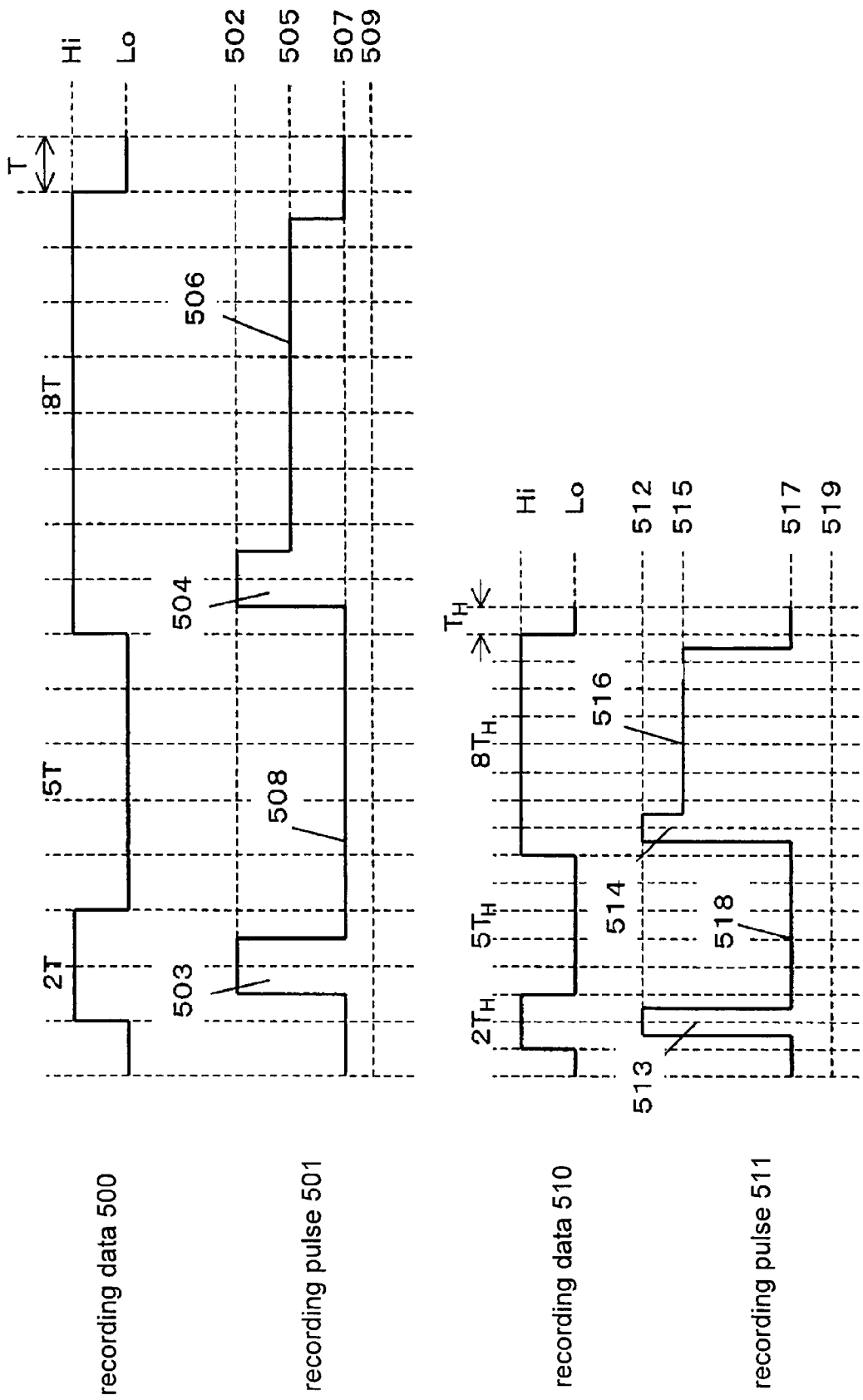
FIG. 5 consists of waveform diagrams of the recording pulses and the recording data used in the method for recording data on an optical disk pertaining to Embodiment 2 of the present invention.

For example, in FIG. 5, recording data 500 during recording at a standard speed includes a Hi signal with a pulse width of 2T (2 times the recording clock period T at a standard speed), a Lo signal with a pulse width of 5T, and a Hi signal with a pulse width of 8T, in that order. When the recording is performed at the standard speed, the recording pulse production unit 4 (see FIG. 3) produces a recording pulse 501 corresponding to the recording data 500 according to the recording power conditions and recording pulse conditions used for the standard speed. With the recording pulse 501, a leading pulse 503 corresponds to the shortest mark with a length of 2T, a space pulse 508 corresponds to a space with a length of 5T, and combinations 504 and 506 of the leading pulse and the subsequent intermediate pulses correspond to a long mark with a length of 8T. With respect to a reference level 509, the level 502 of the leading pulse 503 indicates a first recording power, the level 505 of the intermediate pulse 506 indicates a second recording power, and the level 507 of the space pulse 508 indicates a third recording power. Here, the first recording power is sufficiently higher than the lower limit of the power required to form marks in the middle recording layer 205. The second recording power is lower than the first recording power, and is equal to or greater than the above-mentioned lower limit. The third recording power is less than the above-mentioned lower limit.

Meanwhile, during recording at a double speed, recording data 510 includes a Hi signal with a pulse width of $2T_H$ (2 times the recording clock period $T_H$ at a double speed), a Lo signal with a pulse width of $5T_H$, and a Hi signal with a pulse width of $8T_H$, in that order (see FIG. 5). The recording clock period $T_H$ at a double speed here is one-half the recording clock period T at the standard speed, so each pulse width of the recording data 510 is one-half the pulse width corresponding to the recording data 500. When the recording speed is performed at a double speed, the recording pulse production unit 4 produces a recording pulse 511 corresponding to the recording data 510 according to the recording power conditions and recording pulse conditions used for double speed.

With the recording pulse 511, a leading pulse 513 corresponds to the shortest mark with a length of $2T_H$, a space pulse 518 corresponds to a space with a length of $5T_H$, and combinations 514 and 516 of the leading pulse and the subsequent intermediate pulses correspond to a long mark with a length of $8T_H$. With respect to a reference level 520, the level 512 of the leading pulses 513 and 514 indicates the first recording power, the level 515 of the intermediate pulse 516 indicates the second recording power, and the level 517 of the space pulse 518 indicates the third recording power.

The ratio of the level of the intermediate pulse to the level of the leading pulse, that is the ratio of the second recording power to the first recording power, differs between the two recording pulses 501 and 511 in particular. In FIG. 5, the ratio of the level 515 of the intermediate pulse 516 to the level 512 of the leading pulse 514 in the recording pulse 511 is higher than the ratio of the level 505 of the intermediate pulse 506 to the level 502 of the leading pulse 504 in the recording pulse 501. Therefore, the ratio of the second recording power to the first recording power in the recording pulse 511 is higher than that ratio in the recording pulse 501.

The ratio of the second recording power to the first recording power is changed as above between a standard speed and a double speed for the following reason. The actual pulse width of the laser beam used in recording at a double speed is one-half the actual pulse width used in recording at the standard speed (see FIG. 5). Meanwhile, in recording at the double speed, the power of the laser beam is set higher than during recording at the standard speed. Therefore, the amount of heat transmitted to the optical disk 9 is maintained at the same level. However, since the relationship between the thermal transfer rate of the recording layer and the movement rate of the heating region produced by the laser beam varies for each linear velocity in the optical disk 9, the required power increase differs between the first recording power and the second recording power. In particular, since there is a relative decrease in the thermal transfer rate as the linear velocity rises, the increase in the first recording power has to be set lower than the increase in the second recording power. As discussed above, in Embodiment 2 of the present invention, the ratio of the second recording power to the first recording power at the double speed is higher than the ratio at the standard speed. In FIG. 5, the laser beam power is kept high in the portions 514 and 516 of the recording pulse 511 corresponding to a long mark. As a result, a relative decrease in the thermal conduction rate accompanying an increase in linear velocity is cancelled out, so the size and shape of the long mark formed on the recording track are reliably consistent between the recording at the standard speed and the recording at the double speed. This effect was actually confirmed in the same manner as the effect in Embodiment 1.

As described above, with the data recording method pertaining to Embodiment 2 of the present invention, the ratio of the second recording power to the first recording power is determined for each recording speed. Therefore, as mentioned above, the difference in heat radiation conditions between different recording speeds is cancelled out. As a result, distortion to long marks in particular is suppressed at any of the recording speeds. Even more preferably, the relationship between the recording speed and the ratio of the second recording power to the first recording power is determined for each recording layer. As a result, the difference in heat radiation conditions between recording layers will be cancelled out for each recording speed in the same manner as in Embodiment 1. Thus, a further increase in recording quality can be accomplished for all recording layers, regardless of the recording speed.

Preferably, the ratio of the second recording power to the first recording power set for each recording speed is recorded in the read-only region of the optical disk 9. This ratio is preferably expressed by recording power conditions included in a recording condition set (see FIG. 9). With the optical disk 9 pertaining to Embodiment 2 of the present invention, the ratio of the second recording power to the first recording power expressed by the recording condition set in which a high recording speed is recorded is higher than the ratio expressed by the recording condition set in which a low recording speed is recorded.

With the optical disk recording and reproduction device 1000 pertaining to Embodiment 2 of the present invention, preferably, when the optical disk 9 has been loaded, the recording power setting unit 1 uses the reader unit 30 to read out the recording condition set from the read-only region of the optical disk 9. Further, the recording power setting unit 1 determines the ratio of the second recording power to the first recording power for every recording speed on the basis of the information extracted from the recording condition set that is read out. In addition, the recording power setting unit 1 may perform laser power correction on the basis of the information extracted from the recording condition set, and in particular the ratio of the second recording power to the first recording power may be optimized for every recording speed. In this case, the ratio of the second recording power to the first recording power that has been optimized by the recording power setting unit 1 for every recording speed is preferably recorded on the optical disk 9. The recording power setting unit 1 refers to this optimized ratio during the next recording. This allows the laser beam power to be adjusted more quickly.

Embodiment 3

Preferably, when the above-mentioned optical disk recording and reproduction device 1000 is mounted in a notebook PC or other such portable information device, the method for recording data on an optical disk pertaining to Embodiment 3 of the present invention is utilized. In this case, the optical disk recording and reproduction device 1000 sets the recording speed according to an operating state of the portable information device (whether or not it is connected to an AC power supply, the remaining battery charge, the quantity/priority of tasks being processed, and so forth). In particular, when it is necessary to lower power consumption, the recording speed is generally set lower than the optimal value specific to the optical disk 9. This lowers the laser power consumption (and particularly at the first recording power).

Figure 6:
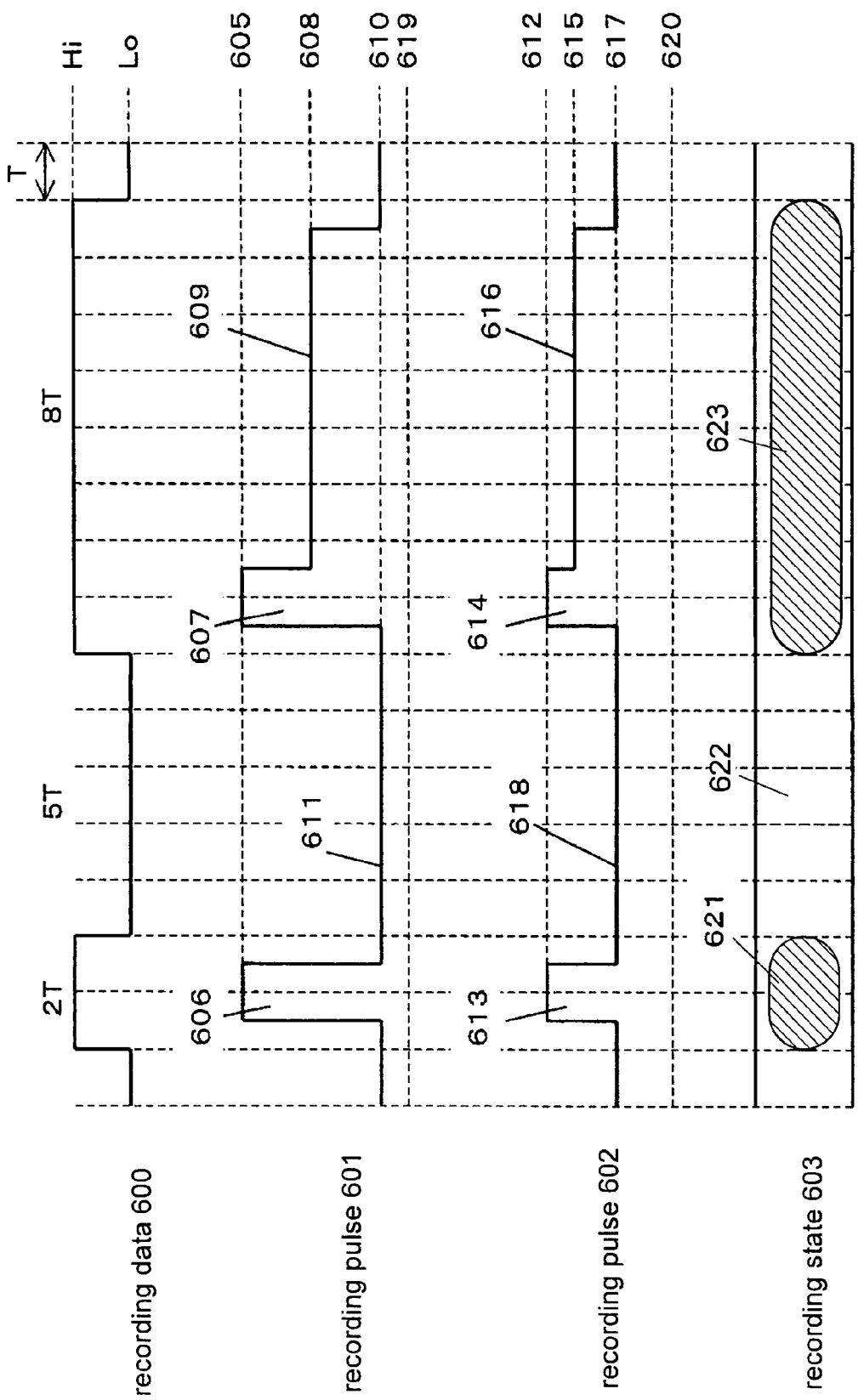
FIG. 6 consists of waveform diagrams of the recording pulses and the recording data used in the method for recording data on an optical disk pertaining to Embodiment 3 of the present invention, and an enlarged plan view of the shapes of the marks formed on the recording track.

For example, in FIG. 6 the recording speed is set to a standard speed, and recording data 600 includes a Hi signal with a pulse width of 2T, a Lo signal with a pulse width of 5T, and a Hi signal with a pulse width of 8T, in that order. The recording pulse production unit 4 produces a recording pulse corresponding to the recording data 600 according to the recording power conditions and recording pulse conditions corresponding to a specific recording speed (standard speed in FIG. 6). Whereas with a conventional optical disk recording and reproduction device a recording pulse 601 is produced, with the optical disk recording and reproduction device 1000 pertaining to Embodiment 3 of the present invention a recording pulse 602 is produced. With these two recording pulses 601 and 602, respectively, leading pulses 606 and 613 each correspond to the shortest mark 621, space pulses 611 and 618 each correspond to a space with a length of 5T, and combinations (607 and 609; 614 and 616) of the leading pulses and the subsequent intermediate pulses each correspond to a long mark 623 with a length of 8T. With respect to reference levels 619 and 620, levels 605 and 612 of the leading pulses 606, 607, 613, and 614 each indicate a first recording power, levels 608 and 615 of the intermediate pulses 609 and 616 each indicate a second recording power, and levels 610 and 617 of the space pulses 611 and 618 each indicate a third recording power. Here, the first recording power is sufficiently higher than the lower limit of the power required to form marks in the recording layer 208 of the optical disk 9. The second recording power is lower than the first recording power, and equal to or greater than the above-mentioned lower limit. The third recording power is less than the above-mentioned lower limit.

The level of the leading pulse and the level of the space pulse with respect to each reference level in particular, that is, the first recording power and the third recording power, are different between the two recording pulses 601 and 602. In FIG. 6, the level 612 of the leading pulses 613 and 614 with respect to the reference level 620 of the recording pulse 602 is lower than the level 605 of the leading pulses 606 and 607 with respect to the reference level 619 of the recording pulse 601. Meanwhile, the level 617 of the space pulse 618 with respect to the reference level 620 of the recording pulse 602 is higher than the level 610 of the space pulse 611 with respect to the reference level 619 of the recording pulse 601. Therefore, the first recording power in the recording pulse 602 is lower than the first recording power in the recording pulse 601, and the third recording power in the recording pulse 602 is higher than the third recording power in the recording pulse 601. Here, the third recording power in the recording pulse 602 is preferably kept within a range of less than the lower limit of the power required to form marks in the recording layer 208, and at least half the value of the lower limit. This avoids the problem of marks being formed in portions where spaces are supposed to be formed.

As described above, with the data recording method pertaining to Embodiment 3 of the present invention, unlike with a conventional method, particularly when the recording speed is set lower than the optimal value specific to the optical disk 9, the first recording power decreases while the third recording power increases. Lowering the first recording power reduces the power consumption of the laser. Raising the third recording power, on the other hand, causes the laser beam to irradiate the spaces to impart enough residual heat to the entire recording track, so this supplements heating by the laser beam emitted at the first recording power. As a result, it is possible to further reduce the first recording power while maintaining the mark in a proper shape. In particular, even when the optical disk 9 has a capability of high-speed recording, the recording speed can be set lower than the optimal value specific to the optical disk 9 for the purpose of reducing the power consumption of the device. Thus, with the data recording method pertaining to Embodiment 3 of the present invention, power consumption can be reduced more effectively than with a conventional method, and at the same time a high-quality recording state that is comparable to the recording state obtained with a conventional method can be obtained. Furthermore, this effect was actually confirmed in the same manner as the effect of Embodiment 1.

Preferably, the third recording power set for every recording speed is recorded in the read-only region of the optical disk 9. The value thereof is preferably expressed by the recording power conditions included in a recording condition set (see FIG. 9). In particular, with a recording condition set in which a recording speed lower than the optimal value specific to the optical disk 9 is recorded, the third recording power is kept below the lower limit for the power required to form marks in the recording layer of the optical disk 9, and at least one-half of the lower limit.

With the optical disk recording and reproduction device 1000 pertaining to Embodiment 3 of the present invention, preferably, when the optical disk 9 has been loaded, the recording power setting unit 1 uses the reader unit 30 to read out the recording condition set from the read-only region of the optical disk 9. Further, the recording power setting unit 1 determines the third recording power for every recording speed on the basis of the information extracted from the recording condition set that is read out. In addition, the recording power setting unit 1 may perform laser power correction on the basis of the information extracted from the recording condition set, and in particular the third recording power may be optimized for every recording speed. In this case, the third recording power that has been optimized by the recording power setting unit 1 for every recording speed is preferably recorded on the optical disk 9. The recording power setting unit 1 refers to this optimized third recording power during the next recording. This allows the laser beam power to be adjusted more quickly.

Embodiment 4

The method for recording data on an optical disk pertaining to Embodiment 4 of the present invention is utilized, for example, when the above-mentioned optical disk recording and reproduction device 1000 sets the recording speed to a higher value (such as a double speed) than its usual value (the optimal value specific to the optical disk 9 (such as a standard speed)), and records data on the recording layer 208 (see FIG. 2). Here, the optical disk recording and reproduction device 1000 reproduces the data recorded on the optical disk 9 at the usual speed (such as a standard speed).

Figure 7:
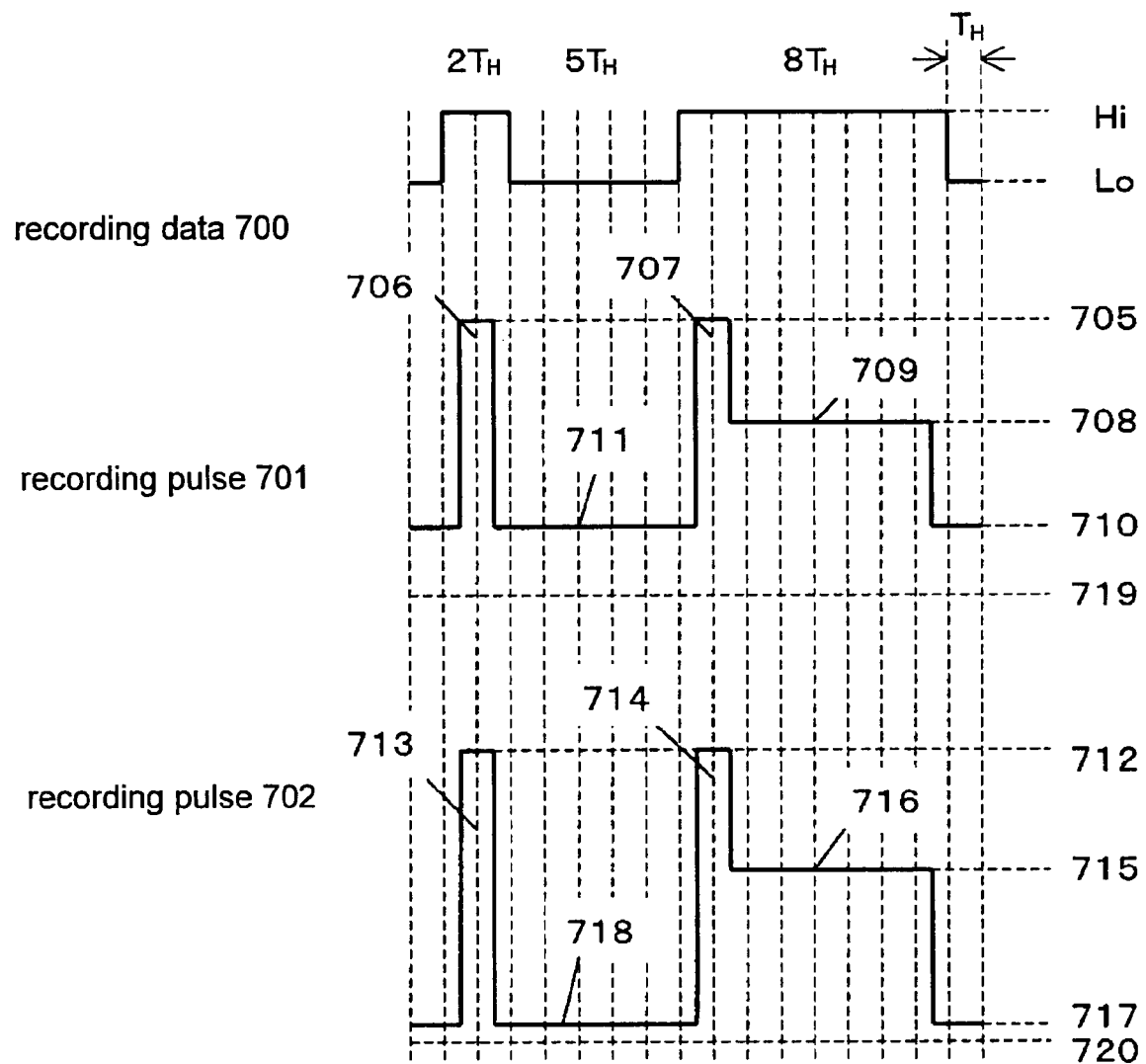
FIG. 7 consists of waveform diagrams of the recording pulses and the recording data used in the method for recording data on an optical disk pertaining to Embodiment 4 of the present invention.

For example, in FIG. 7, recording data 700 includes a Hi signal with a pulse width of $2T_H$ (2 times the recording clock period $T_H$ at a double speed), a Lo signal with a pulse width of $5T_H$, and a Hi signal with a pulse width of $8T_H$, in that order. When the recording is performed at a double speed, the recording pulse production unit 4 produces a recording pulse corresponding to the recording data 700 according to the recording power conditions and recording pulse conditions used for the double speed. Whereas with a conventional optical disk recording and reproduction device a recording pulse 701 is produced, with the optical disk recording and reproduction device 1000 pertaining to Embodiment 4 of the present invention a recording pulse 702 is produced. With these two recording pulses 701 and 702, respectively, leading pulses 706 and 713 each correspond to the shortest mark, space pulses 711 and 718 each correspond to a space with a length of 5T, and combinations (707 and 709; 714 and 716) of the leading pulses and the subsequent intermediate pulses each correspond to a long mark with a length of $8T_H$. With respect to reference levels 719 and 720, levels 705 and 712 of the leading pulses 706, 707, 713, and 714 each indicate a first recording power, levels 708 and 715 of the intermediate pulses 709 and 716 each indicate a second recording power, and levels 710 and 717 of the space pulses 711 and 718 each indicate a third recording power. Here, the first recording power is sufficiently higher than the lower limit of the power required to form marks in the recording layer 208 of the optical disk 9. The second recording power is lower than the first recording power, and equal to or greater than the above-mentioned lower limit. The third recording power is less than the above-mentioned lower limit.

The ratio of the level of the space pulses to the level of the leading pulses in particular, that is, the ratio of the third recording power to the first recording power, is different between the two recording pulses 701 and 702. In FIG. 7, the ratio of the level 717 of the space pulse 718 to the level 712 of the leading pulses 713 and 714 in the recording pulse 702 is lower than the ratio of the level 710 of the space pulse 711 to the level 705 of the leading pulses 706 and 707 in the recording pulse 701. Therefore, the ratio of the third recording power to the first recording power in the recording pulse 702 is lower than the ratio in the recording pulse 701. In particular, the level 712 of the leading pulses with respect to the reference level 720 of the recording pulse 702 is higher than the level 705 of the leading pulses with respect to the reference level 719 of the recording pulse 701, and the level 717 of the space pulses with respect to the reference level 720 of the recording pulse 702 is lower than the level 710 of the space pulses with respect to the reference level 719 of the recording pulse 701.

With a conventional optical disk recording and reproduction device, the three different recording powers as indicated by the recording pulse 701 are all higher than the recording powers used during data recording at a standard speed. In this case, the reduction in the amount of heat accompanying a reduction in the width of the recording pulse is cancelled out by an increase in recording power. However, since the amount of residual heat imparted to the spaces tends to be excessive, expansion of the marks tends to be excessively suppressed, and the size of the shortest mark in particular tends to be insufficient. By contrast, with the optical disk recording and reproduction device pertaining to Embodiment 4 of the present invention, the first and second recording powers indicated by the recording pulse 702 are higher than the recording powers used during data recording at a standard speed, but the third recording power is equal to or less than the third recording power applied during data recording at a standard speed. Therefore, the reduction in the amount of heat accompanying a reduction in the width of the recording pulse in the region of the recording track where the marks are to be formed is cancelled out by an increase in the (primarily first) recording power, whereas the amount of residual heat is moderately maintained in the region where the spaces are to be formed, so expansion of marks is moderately suppressed. As a result, the shortest mark in particular is formed in the proper size and shape at both standard speed and double speed.

This effect was actually confirmed by the following procedure, in the same manner as in Embodiment 1.

Figure 8:
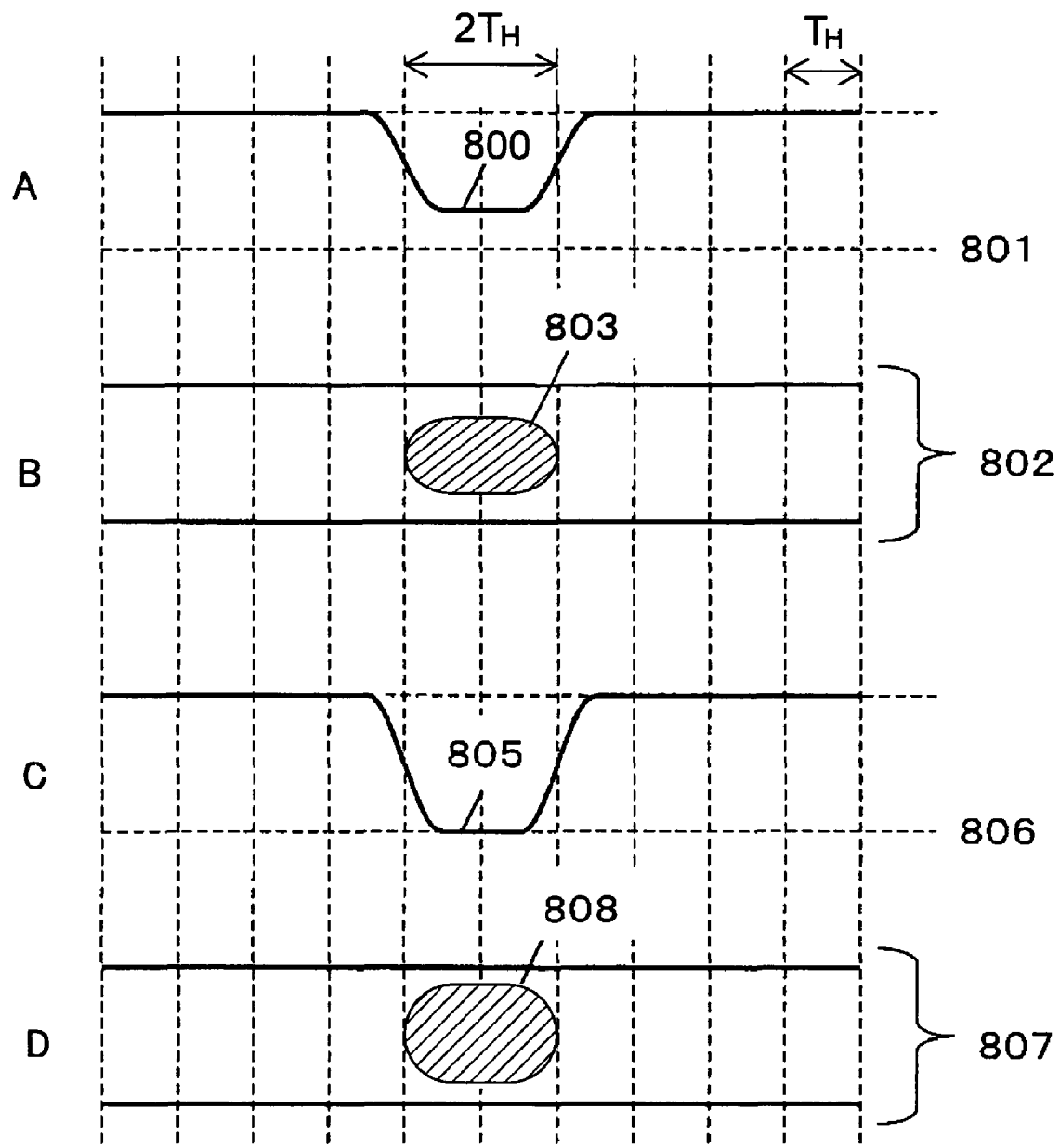
FIG. 8 is a diagram of the relationships between equalized reproduction signals and the shapes of the marks on the recording track in Embodiment 4 of the present invention.

First, the recording layer 208 was irradiated with the laser beam at a power according to the combination of the leading pulse 706 and the space pulse 711 included in the recording pulse 701, and data was reproduced from the region of the recording layer 208 irradiated with this laser beam. FIGS. 8A and 8B show the relationships between the shape of the marks and the waveform of the equalized reproduction signal measured by the waveform measurement unit 18 (see FIG. 3) of the reader 30. With the equalized reproduction signal obtained from the recording layer 208, the amplitude of the pulse 800 was too small for the target level 801 to be reached (see FIG. 8A). This tells us that the shortest mark 803 formed on the recording track 802 in the recording layer 208 did not reach the proper width (see FIG. 8B). Next, the recording layer 208 was irradiated with the laser beam at a power according to a combination of the leading pulse 713 and the space pulse 718 included in the recording pulse 702, and data was reproduced from the region of the recording layer 208 irradiated with this laser beam. FIGS. 8C and 8D show the relationship between the shape of the mark and the waveform of the equalized reproduction signal as measured by the waveform measurement unit 18 of the reader 30. The amplitude of the pulse 805 was larger with the equalized reproduction signal obtained from the recording layer 208, reaching the target level 806 (see FIG. 8C). This tells us that the shortest mark 808 formed on the recording track 807 gained the proper width in the recording layer 208 (see FIG. 8D).

As described above, with the data recording method pertaining to Embodiment 4 of the present invention, when data is recorded at different linear velocities on the same optical disk, the ratio of the third recording power to the first recording power is determined for every linear velocity. Particularly when the recording speed is higher than the optimal value specific to that optical disk, the ratio of the third recording power to the first recording power is low. As a result, there is greater contrast between the residual heat imparted to the spaces and the heat imparted to the marks, so the shape and size of the shortest mark in particular are reliably equal to the shape and size when being recorded at the optimal recording speed specific to the optical disk. This affords a further increase in recording quality.

Since the optical disk 9 is a multilayer disk, the ratio of the third recording power to the first recording power is preferably determined for every recording layer, just as with the ratio of the second recording power to the first recording power in Embodiment 1. More preferably, the ratio of the third recording power to the first recording power in the deepest recording layer 202, which is farthest from the head 7, is higher than that of the other recording layers 205 and 208. This means that the power of the laser beam irradiating the portions of the recording track where spaces are to be formed is higher in the deepest recording layer 202 than in the other recording layers 205 and 208, so the reduction in the amount of residual heat accompanying an increase in the amount of heat radiation is cancelled out. As a result, the residual heat imparted to the spaces moderately suppresses the expansion of the marks, so the shape and size of the shortest mark in particular are reliably equal to the shape and size of the shortest mark formed in the other recording layers. This affords a further increase in recording quality.

Preferably, the ratio of the third recording power to the first recording power set for every recording speed (or for every recording layer) is recorded in the read-only region of the optical disk 9. This ratio is preferably expressed by the recording power conditions included in a recording condition set (see FIG. 9). With the optical disk 9 pertaining to Embodiment 4 of the present invention, the ratio of the third recording power to the first recording power expressed by a recording condition set in which a high recording speed is recorded is lower than the ratio expressed by a recording condition set in which a low recording speed is recorded. Furthermore, the ratio of the third recording power to the first recording power expressed by a recording condition set with respect to the deepest recording layer 202 may be higher than the ratio expressed by a recording condition set with respect to the other recording layers 205 and 208.

With the optical disk recording and reproduction device 1000 pertaining to Embodiment 4 of the present invention, preferably, when the optical disk 9 is loaded, the recording power setting unit 1 uses the reader unit 30 to read out a recording condition set from the read-only region of the optical disk 9. Further, the recording power setting unit 1 determines the ratio of the third recording power to the first recording power for every recording speed (or for every recording layer) on the basis of information extracted from the recording condition set that has been read out. In addition, the recording power setting unit 1 may perform laser power correction on the basis of the information extracted from the recording condition set, and in particular the ratio of the third recording power to the first recording power may be optimized for every recording speed (or for every recording layer). In this case, the ratio of the third recording power to the first recording power that has been optimized by the recording power setting unit 1 for every recording speed (or for every recording layer) is preferably recorded on the optical disk 9. The recording power setting unit 1 refers to this optimized ratio during the next recording. This allows the laser beam power to be adjusted more quickly.

Figure 10:
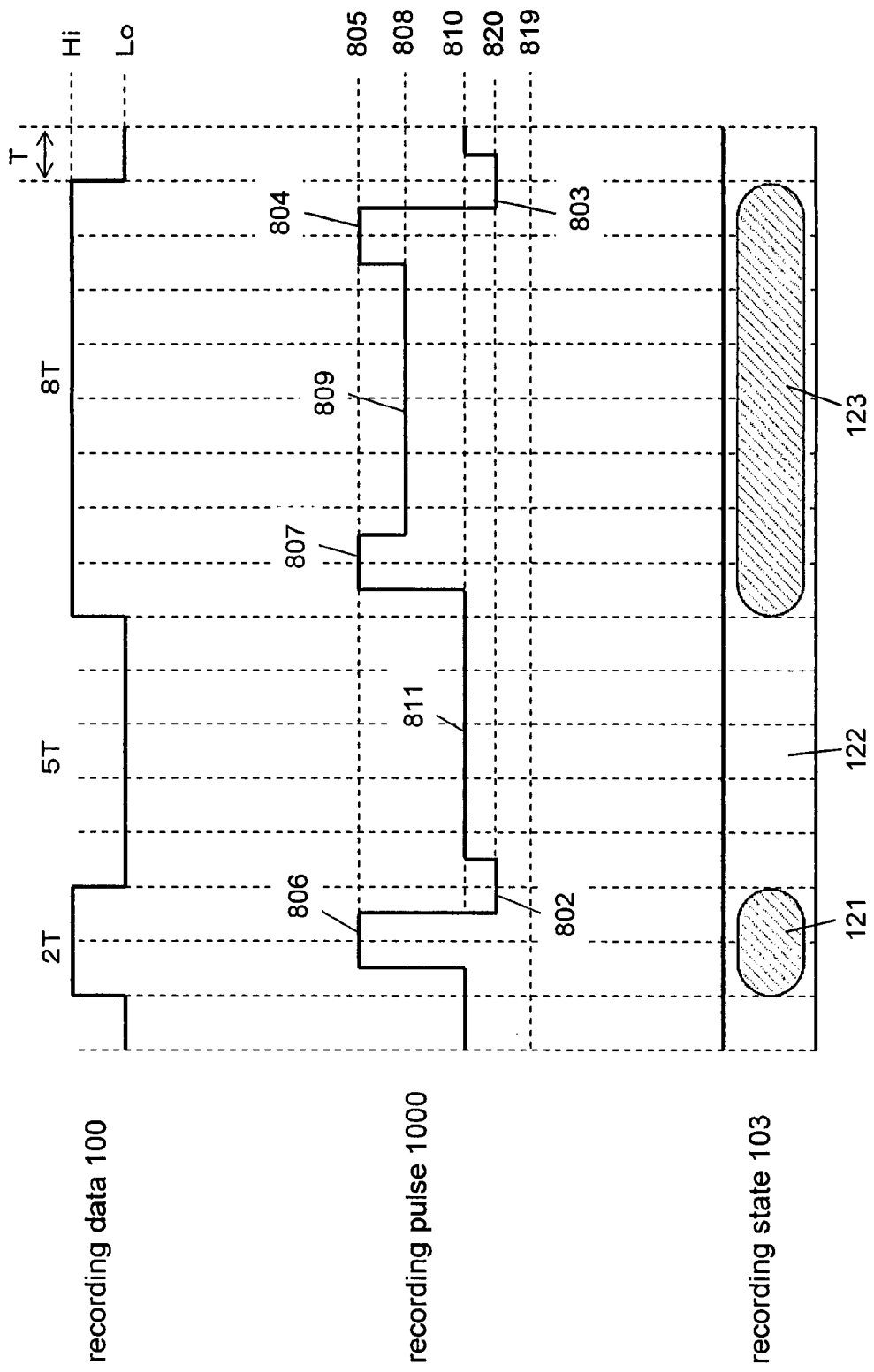
FIG. 10 consists of waveform diagrams of the recording pulses and the recording data used in the method for recording data on an optical disk pertaining to another embodiment of the present invention, and an enlarged plan view of the shapes of the marks formed on the recording track.
Figure 11:
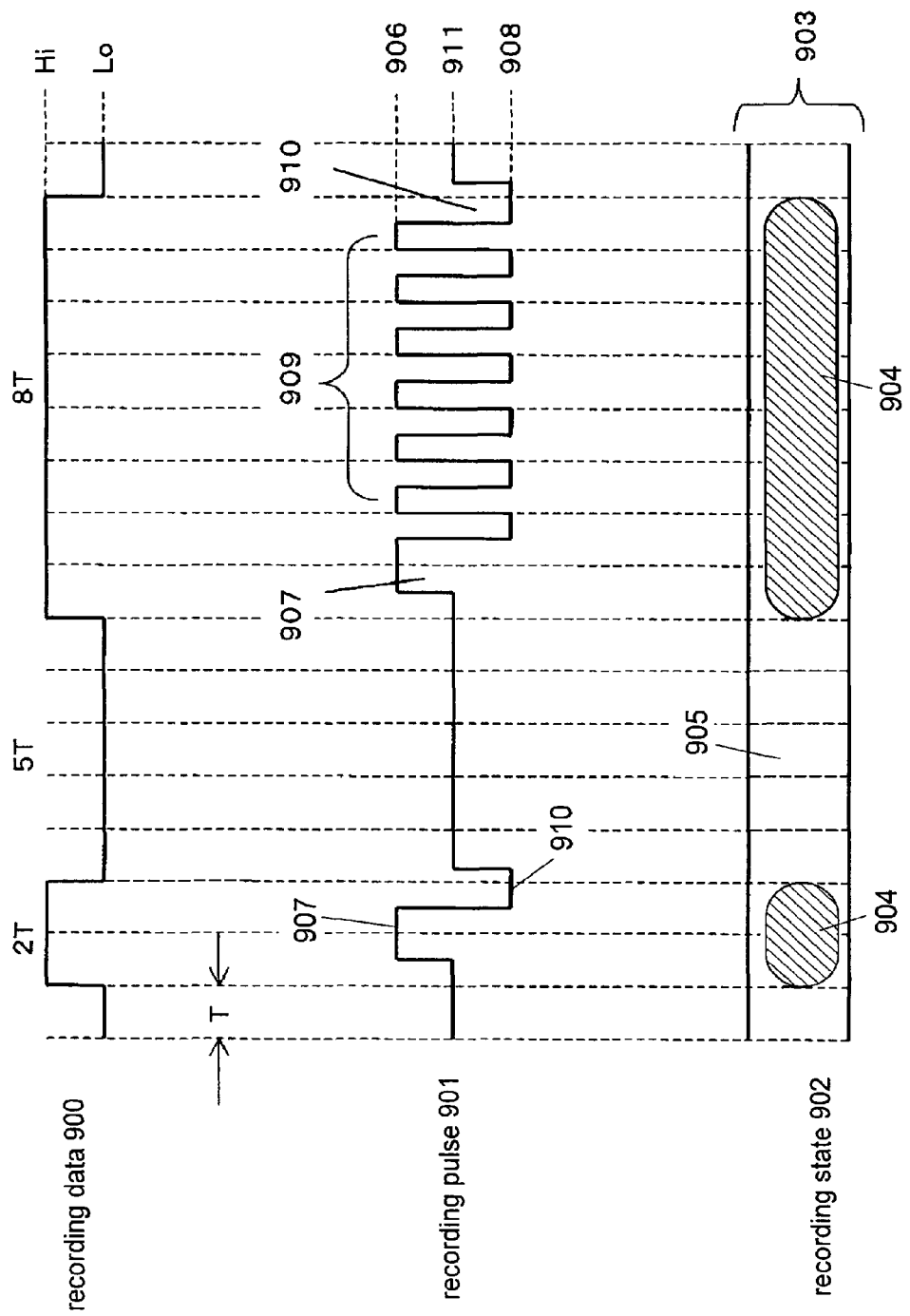
FIG. 11 consists of waveform diagrams of the recording pulses and the recording data obtained with a conventional method for recording data on an optical disk, and an enlarged plan view of the shapes of the marks formed on the recording track.

With the write strategy utilized in the above Embodiments 1 to 4 of the present invention, the recording pulse includes either a leading pulse or a combination of a leading pulse and an intermediate pulse (see FIG. 1 and FIGS. 5 to 7). Alternatively, the recording pulse may include a leading pulse, a combination of a leading pulse and an intermediate pulse, or a combination of a leading pulse, an intermediate pulse, and a last pulse (see FIG. 10). Further, the recording pulse may include a cooling pulse at its tail. For example, in FIG. 10, the recording data 100 includes a Hi signal with a pulse width of 2T, a Lo signal with a pulse width of 5T, and a Hi signal with a pulse width of 8T, in that order. With the recording pulse 801 here, a leading pulse 806 and a cooling pulse 802 subsequent to the tail thereof correspond to the shortest mark 121 with a length of 2T, a space pulse 811 corresponds to a space 122 with a length of 5T, and a combination of a leading pulse 807, an intermediate pulse 809, a last pulse 804, and a cooling pulse 803 corresponds to a long mark with a length of 8T. With respect to a reference level 819, the level 805 of the leading pulses 806, 807, and the last pulse 804 indicates a first recording power, the level 808 of the intermediate pulse 809 indicates a second recording power, and the level 810 of the space pulse 811 indicates a third recording power. Furthermore, the level 820 of the cooling pulses 802 and 803 is lower than the level 810 of the space pulse 811. The rear end of the long mark 123 is formed with a proper width at a higher degree of precision because of the last pulse 804. Meanwhile, each rear end of the marks 121 and 123 is formed with a proper width at a higher degree of precision because of the cooling pulses 802 and 803.

With the above embodiments of the present invention, the optical disk 9 is a three-layer disk (see FIG. 2), but the optical disk 9 may instead have just one layer, or two layers, or may be a multilayer disk of four or more layers.

With the above embodiments of the present invention, the recording speed of the optical disk recording and reproduction device 1000 can be changed between two speeds: standard speed and double speed. Instead, the recording speed may be set to quadruple speed or higher, or may conversely be set to half-speed or lower.

INDUSTRIAL APPLICABILITY

The present invention relates to an optical disk recording device, and to a data recording method thereof. As described above, the recording power conditions are determined for every recording layer, or every recording speed, of the optical disk. Thus, the present invention clearly has industrial applicability.

The invention claimed is:
1. A method for producing a recording pulse that includes a combination of a leading pulse corresponding to a first recording power and a subsequent intermediate pulse corresponding to a second recording power, and for recording data onto an optical disk having a plurality of recording layers, the data being recorded onto the optical disk based on the recording pulse, the method comprising:
   setting the first recording power at a sufficiently higher level than a lower limit of power required to form marks on the plurality of recording layers of the optical disk;
   setting the second recording power at a level lower than the first recording power, the second recording power being equal to or greater than the lower limit of the power required to continuously form the marks on the plurality of recording layers of the optical disk, such that the marks are continuously formed on the plurality of recording layers of the optical disk while the second recording power is applied;
   determining a ratio of the second recording power to the first recording power for each of the plurality of recording layers, such that the ratio for a farthest recording layer away from a head of an optical disk recording device differs from the ratio for any other recording layer of the plurality of recording layers, when recording the data onto the optical disk; and
   recording the data onto the optical disk according to the determined ratio of the second recording power to the first recording power for each of the plurality of recording layers.

2. The method according to claim 1, wherein the determining determines the ratio of the second recording power to the first recording power to be higher for the recording layer farthest away from the head than for the other recording layers of the plurality of recording layers.

3. The method for recording data on an optical disk according to claim 1, wherein the recording pulse includes a combination of the leading pulse, the intermediate pulse, and a subsequent last pulse.

4. The method for recording data on an optical disk according to claim 1, wherein the recording pulse includes a cooling pulse at its tail.

5. The method according to claim 1, further comprising a step of recording, onto the optical disk, data expressing the determined ratio of the second recording power to the first recording power for each of the plurality of recording layers.

6. The method for recording data on an optical disk according to claim 1, wherein when the data is recorded on the optical disk at different linear velocities, the ratio of the second recording power to the first recording power is determined for each of the linear velocities.

7. An optical disk recording device for recording data onto an optical disk having a plurality of recording layers, the data being recorded onto the optical disk based on a recording pulse, the optical disk recording device comprising:
   a recording pulse production unit operable to produce the recording pulse that includes a combination of a leading pulse corresponding to a first recording power and a subsequent intermediate pulse corresponding to a second recording power; and
   a recording power setting unit operable to:
      set the first recording power at a sufficiently higher level than a lower limit of power required to form marks on the plurality of recording layers of the optical disk;
      set the second recording power at a level lower than the first recording power and, the second recording power being equal to or greater than the lower limit of the power required to continuously form the marks on the plurality of recording layers of the optical disk, such that the marks are continuously formed on the plurality of recording layers of the optical disk while the second recording power is applied; and determine a ratio of the second recording power to the first recording power for each of the plurality of recording layers, such that the ratio for a farthest recording layer away from a head of an optical disk recording device differs from the ratio for any other recording layer of the plurality of recording layers when the data is recorded onto the optical disk, wherein the optical disk recording device records the data onto the optical disk according to the determined ratio of the second recording power to the first recording power for each of the plurality of recording layers.

8. A semiconductor integrated circuit to be mounted in an optical disk recording device for recording data onto an optical disk having a plurality of recording layers, the data being recorded onto the optical disk based on a recording pulse, the semiconductor integrated circuit comprising:

a recording pulse production unit operable to produce the recording pulse that includes a combination of a leading pulse corresponding to a first recording power and a subsequent intermediate pulse corresponding to a second recording power; and a recording power setting unit operable to:
set the first recording power at a sufficiently higher level than a lower limit of power required to form marks on the plurality of recording layers of the optical disk;
set the second recording power at a level lower than the first recording power and the second recording power being equal to or greater than the lower limit of the power required to continuously form the marks on the plurality of recording layers of the optical disk, such that the marks are continuously formed on the plurality of recording layers of the optical disk while the second recording power is applied; and
determine a ratio of the second recording power to the first recording power for each of the plurality of recording layers, such that the ratio for a farthest recording layer away from a head of an optical disk recording device differs from the ratio for any other recording layer of the plurality of recording layers, when the data is recorded onto the optical disk, wherein the optical disk recording device records the data onto the optical disk according to the determined ratio of the second recording power to the first recording power for each of the plurality of recording layers.

9. An non-transitory computer-readable optical recording disk onto which data is recorded based on a recording pulse that includes a combination of a leading pulse corresponding to a first recording power and a subsequent intermediate pulse corresponding to a second recording power, the non-transitory computer-readable optical recording disk comprising:

a plurality of recording layers; and a region where data is recorded expressing a ratio of the second recording power to the first recording power, the ratio being set for each of the plurality of recording layers, such that the ratio for a farthest recording layer away from a head of an optical disk recording device differs from the ratio for any other recording layer of the plurality of recording layers, when the data is recorded onto the computer-readable optical recording disk, wherein the first recording power is sufficiently higher than a lower limit of power required to form marks on the plurality of recording layers, and the second recording power is lower than the first recording power, such that the second recording power is equal to or greater than the lower limit of the power required to continuously form the marks on the plurality of recording layers, and such that the marks are continuously formed on the plurality of recording layers of the computer-readable optical recording disk while the second recording power is applied.

* * * * *